United States Patent
Chou et al.

(10) Patent No.: US 8,743,928 B2
(45) Date of Patent: Jun. 3, 2014

(54) ADAPTIVE EQUALIZER AND OPERATING METHOD THEREOF

(75) Inventors: Min-Chung Chou, Toufen Township, Miaoli County (TW); Da-Rong Huang, Hualien (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 13/547,688

(22) Filed: Jul. 12, 2012

(65) Prior Publication Data

US 2013/0022098 A1 Jan. 24, 2013

(30) Foreign Application Priority Data

Jul. 19, 2011 (TW) .............................. 100125414 A

(51) Int. Cl.
*H04B 1/00* (2006.01)
*H04B 3/46* (2006.01)
*H04J 11/00* (2006.01)
(52) U.S. Cl.
USPC ........................... 375/141; 375/226; 370/208
(58) Field of Classification Search
USPC .................................. 375/141, 226; 370/208
See application file for complete search history.

(56) References Cited

U.S. PATENT DOCUMENTS

| | | | | |
|---|---|---|---|---|
| 4,985,900 A | * | 1/1991 | Rhind et al. | 375/226 |
| 5,757,853 A | * | 5/1998 | Tsujimoto | 375/141 |
| 5,889,823 A | * | 3/1999 | Agazzi et al. | 375/341 |
| 5,954,837 A | * | 9/1999 | Kim | 714/795 |
| 6,075,808 A | * | 6/2000 | Tsujimoto | 375/143 |
| 7,760,798 B2 | * | 7/2010 | Hidaka | 375/232 |
| 2002/0181388 A1 | * | 12/2002 | Jain et al. | 370/208 |
| 2004/0131109 A1 | * | 7/2004 | Kim et al. | 375/148 |
| 2005/0286625 A1 | * | 12/2005 | Jung | 375/232 |

\* cited by examiner

*Primary Examiner* — Leon-Viet Nguyen
*Assistant Examiner* — Sarah Hassan

(57) ABSTRACT

An adaptive equalizer and operating method thereof are disclosed. The adaptive equalizer is oversampling-based. The adaptive equalizer includes a searching module, a compensation module, and an operating module. The searching module searches the equalizer setting from a lower compensation to a higher compensation to obtain a first equalizer setup value according a first monitored result of a monitor and then searches the equalizer setting from a higher compensation to a lower compensation to obtain a second equalizer setup value according to a second monitored result of the monitor. The operating module performs an operation on the first equalizer setup value and the second equalizer setup value to obtain an optimized equalizer setup value.

10 Claims, 4 Drawing Sheets

ADAPTIVE EQUALIZER AND OPERATING METHOD THEREOF

BACKGROUND OF THE INVENTION

1. Field of the Invention

The invention relates to an adaptive equalizer; in particular, to an oversampling-based adaptive equalizer and an operating method thereof.

2. Description of the Prior Art

In general, the main function of an adaptive equalizer is to monitor the Inter Symbol Interference (ISI) phenomenon between signals, and compensate the channel loss generated when the signals are transformed accordingly. However, in fact, it is hard for the adaptive equalizer to monitor the ISI phenomenon between signals, especially for an oversampling-based adaptive equalizer.

The oversampling-based adaptive equalizer can monitor the ISI phenomenon between signals only based on the results good enough, that is to say, the oversampling-based adaptive equalizer fails to trace the data edge of the signal; therefore, the oversampling-based adaptive equalizer cannot obtain the optimized setting to perform channel loss compensation on the signal, and the channel loss compensation performed on the signal will be under compensation or over compensation.

That is to say, the current oversampling-based adaptive equalizer practically fails to perform optimized compensation on the channel loss of the signal; therefore, the signal channel loss compensation effect of the oversampling-based adaptive equalizer is not good enough, and this problem should be further overcome.

SUMMARY OF THE INVENTION

Therefore, the invention provides an oversampling-based adaptive equalizer and an operating method thereof to solve the above-mentioned problems occurred in the prior arts.

A first embodiment of the invention is an adaptive equalizer. In this embodiment, the adaptive equalizer is oversampling-based. The adaptive equalizer includes a searching module, a compensation module, and an operating module. The searching module searches equalizer setting from a lower compensation to a higher compensation to obtain a first equalizer setup value according a first monitored result of a monitor and then searches equalizer setting from the higher compensation to the lower compensation to obtain a second equalizer setup value according to a second monitored result of the monitor. The operating module performs an operation on the first equalizer setup value and the second equalizer setup value to obtain an optimized equalizer setup value.

In practical applications, the operation performed by the operating module on the first equalizer setup value and the second equalizer setup value is an arithmetic mean operation, a geometric mean operation, a quadratic mean operation, or a weighted mean operation. The searching module searches equalizer setting from the lower compensation setting to the higher compensation setting at a first time, and searches equalizer setting from the higher compensation to the lower compensation at a second time, the first time is earlier or later than the second time.

The compensation module is used for performing channel loss compensation on a signal according to the optimized equalizer setup value to make the channel loss compensation performed on the signal optimized. The first equalizer setup value corresponds to a phenomenon that the channel loss compensation is under compensation and the second equalizer setup value corresponds to a phenomenon that the channel loss compensation is over compensation.

Another embodiment of the invention is an adaptive equalizer operating method. In this embodiment, the adaptive equalizer operating method is applied in an oversampling-based adaptive equalizer. The adaptive equalizer operating method includes steps of: (a) the adaptive equalizer searching equalizer setting from a lower compensation setting to a higher compensation setting to obtain a first equalizer setup value; (b) the adaptive equalizer searching equalizer setting from the higher compensation to the lower compensation to obtain a second equalizer setup value; (c) the adaptive equalizer performing an operation on the first equalizer setup value and the second equalizer setup value to obtain an optimized equalizer setup value.

In practical applications, the step (a) and the step (b) are performed at a first time and a second time respectively, the first time is earlier or later than the second time. In the step (c), the operation performed by the adaptive equalizer on the first equalizer setup value and the second equalizer setup value is an arithmetic mean operation, a geometric mean operation, a quadratic mean operation, or a weighted mean operation.

The adaptive equalizer operating method can further include the step of: (d) the adaptive equalizer performing channel loss compensation on a signal according to the optimized equalizer setup value to make the channel loss compensation performed on the signal optimized.

Compared to the prior art, the oversampling-based adaptive equalizer and the operating method thereof in this invention perform two data edge searches on signals along the paths in opposite directions respectively, and then operate the equalizer setting results obtained in the two data edge searches to obtain the optimized equalizer setup value. Since the two equalizer setting results respond to a phenomenon that the channel loss compensation is under compensation and a phenomenon that the channel loss compensation is over compensation respectively, the optimized equalizer setup value obtained by operating the two equalizer setting results can effectively avoid the under compensation phenomenon and the over compensation phenomenon, and the effect of the channel loss compensation performed by the oversampling-based adaptive equalizer of the invention on the signal can be optimized.

The advantage and spirit of the invention may be understood by the following detailed descriptions together with the appended drawings.

DETAILED DESCRIPTION

A first preferred embodiment of the invention is an adaptive equalizer. In this embodiment, the adaptive equalizer is applied in a signal transmission system, and the adaptive equalizer is an oversampling-based adaptive equalizer, but not limited to this.

Figure 1:
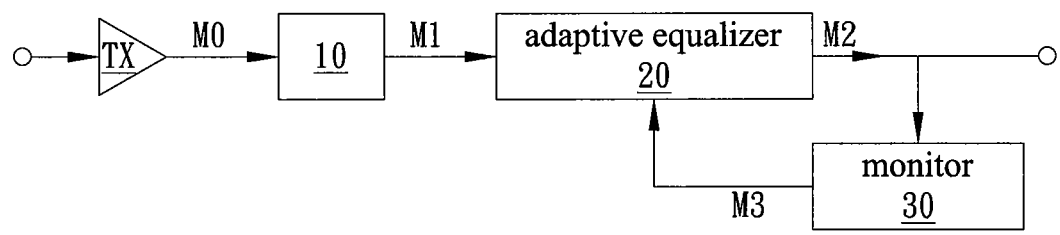
FIG. 1 illustrates the function block diagram of the adaptive equalizer applied in the signal transmission system.

Please refer to FIG. 1. FIG. 1 illustrates the function block diagram of the adaptive equalizer applied in the signal transmission system of the invention. As shown in FIG. 1, the signal transmission system 1 at least includes a signal transmission end TX, a signal transmission line 10, an adaptive equalizer 20, and a monitor 30. A signal M0 outputted from the signal transmission end TX is transmitted by the signal transmission line 10 and attenuated to be a signal M1, and the signal M1 is inputted into the adaptive equalizer 20. When the adaptive equalizer 20 receives the signal M1, the adaptive equalizer 20 processes the signal M1 and outputs a signal M2. In practical applications, the adaptive equalizer 20 is oversampling-based; the monitor 30 can be an eye opening monitor (EOM) used to monitor the signal M2 outputted by the adaptive equalizer 20, and generate a feedback signal M3 to the adaptive equalizer 20 according to the monitored result, but not limited to this.

Figure 2:
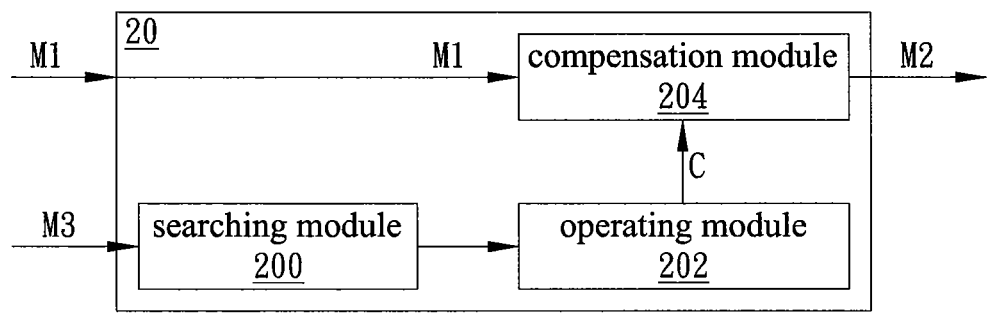
FIG. 2 illustrates the function block diagram of the adaptive equalizer 20 shown in FIG. 1.

Next, please refer to FIG. 2. FIG. 2 illustrates the function block diagram of the adaptive equalizer 20 shown in FIG. 1. As shown in FIG. 2, the adaptive equalizer 20 includes a searching module 200, an operating module 202, and a compensation module 204. Wherein, the operating module 202 is coupled to the searching module 200; the compensation module 204 is coupled to the operating module 202. Next, the modules in the adaptive equalizer 20 and their functions will be introduced as follows.

Figure 3A:
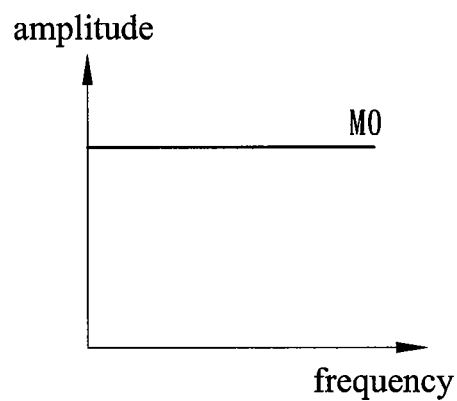
FIG. 3A illustrates the amplitude-frequency diagram of the signal M0 outputted by the signal transmission end.
Figure 3B:
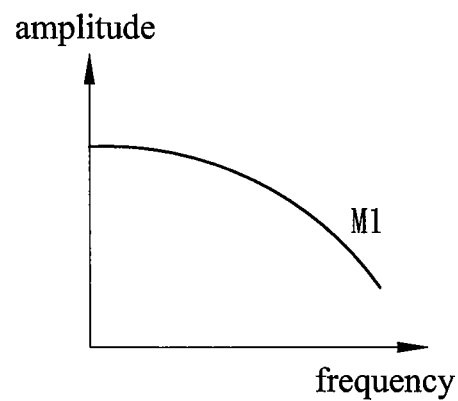
FIG. 3B illustrates the amplitude-frequency diagram of the signal M1 transmitted by the signal transmission line 10.

At first, please refer to FIG. 3A and FIG. 3B, when the adaptive equalizer 20 receives the attenuated signal M1 from the signal transmission line 10, the searching module 200 will search equalizer setting from a lower compensation to a higher compensation at a first time, and obtain a first equalizer setup value according a first monitored result of the monitor 30. At a second time, the searching module 200 will search equalizer setting from the higher compensation to the lower compensation, and obtain a second equalizer setup value according a second monitored result of the monitor 30.

In fact, the first time is earlier or later than the second time, that is to say, the first time and the second time are not the same; the directions of the first path and the second path are opposite. It should be noticed that the lower compensation and the higher compensation are only relative values, there is no specific limitations.

Figure 3C:
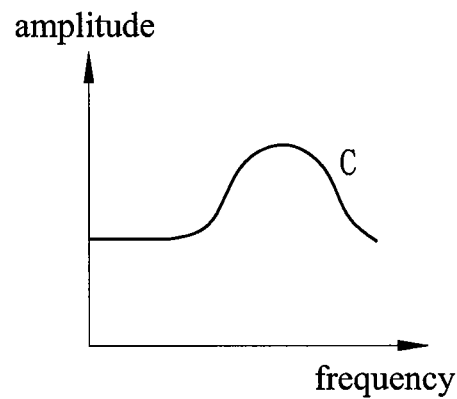
FIG. 3C illustrates the amplitude-frequency diagram of the optimized equalizer setup value C operated by the operating module 202.

Then, the operating module 202 will perform an operation on the first equalizer setup value and the second equalizer setup value to obtain an optimized equalizer setup value C (as shown in FIG. 3C), and then transmit the optimized equalizer setup value C into the compensation module 204.

In practical applications, the operation performed by the operating module 202 on the first equalizer setup value and the second equalizer setup value can be an arithmetic mean operation, a geometric mean operation, a quadratic mean operation, or a weighted mean operation. It depends on practical needs without any specific limitations.

Figure 3D:
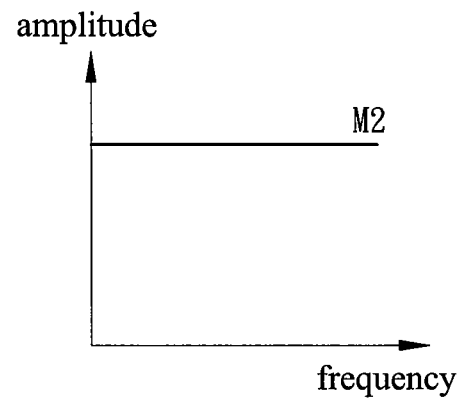
FIG. 3D illustrates the amplitude-frequency diagram of the signal M2 generated after the channel loss of the signal M1 is compensated by the compensation module 204 according to the optimized equalizer setup value C.

After the compensation module 204 receives the signal M1 and the optimized equalizer setup value C, the compensation module 204 will perform a channel loss compensation on the signal M1 according to the optimized equalizer setup value C, so that the optimized channel loss compensation can be performed on the signal M1 to generate the signal M2 (as shown in FIG. 3D) and output the signal M2.

As shown in FIG. 1 and FIG. 2, the monitor 30 will monitor the signal M2 outputted by the compensation module 204 of the adaptive equalizer 20, and generate the feedback signal M3 to the searching module 200 of the adaptive equalizer 20 according to the monitored result. Then, when the searching module 200 searches again, it can be suitably adjusted according to the feedback signal M3, so that the searching module 200 can reach the optimized effect.

Figures 4A, 4B, 4C, 4D:
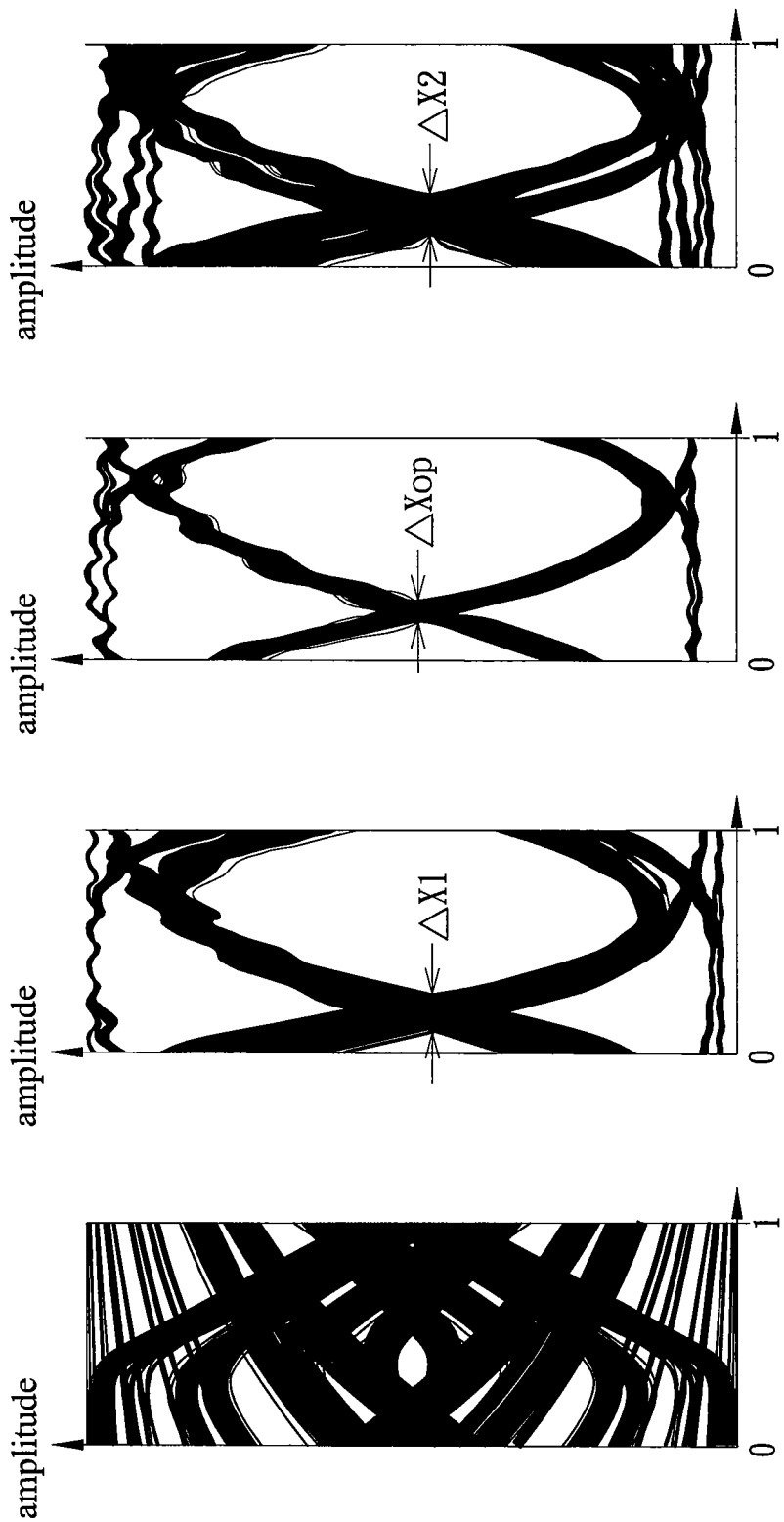
FIG. 4A illustrates the signal not compensated yet.
FIG. 4B illustrates the jitter ΔX1 caused by the Inter Symbol Interference (ISI) phenomenon after the signal is compensated by the first equalizer setup value.
FIG. 4C illustrates the jitter ΔXop caused by the Inter Symbol Interference (ISI) phenomenon after the signal is compensated by the optimized equalizer setup value.
FIG. 4D illustrates the jitter ΔX2 caused by the Inter Symbol Interference (ISI) phenomenon after the signal is compensated by the second equalizer setup value.

It should be noticed that in the prior art, because the conventional oversampling-based adaptive equalizer only searches the data edge of the signal along single searching path, and the first equalizer setup value corresponds to a phenomenon that the channel loss compensation is under compensation (as shown in FIG. 4B, after the signal is compensated by the first equalizer setup value, the jitter caused by the Inter Symbol Interference (ISI) phenomenon is ΔX1) and the second equalizer setup value corresponds to a phenomenon that the channel loss compensation is over compensation (as shown in FIG. 4D, after the signal is compensated by the second equalizer setup value, the jitter caused by the Inter Symbol Interference (ISI) phenomenon is ΔX2). Therefore, the conventional adaptive equalizer will fail to obtain the optimized setting, and when the conventional adaptive equalizer performs channel loss compensation on the signal, the channel loss compensation performed by the signal will be under compensation or over compensation. It cannot reach the optimized signal channel loss compensation.

In view of this, the oversampling-based adaptive equalizer of the invention performs two data edge searches on signals along the paths in opposite directions respectively, and then operates the equalizer setting results obtained in the two data edge searches to obtain the optimized equalizer setup value C to perform optimized compensation on the channel loss of the signal. As shown in FIG. 4C, after the signal is compensated by the optimized equalizer setup value C, the jitter caused by the ISI phenomenon is ΔXop. Since ΔXop is smaller than ΔX1 and ΔX2, the oversampling-based adaptive equalizer 20 can use the optimized equalizer setup value C to reduce the jitter caused by the ISI phenomenon to the minimum to reach the optimized signal channel loss compensation. Therefore, the above-mentioned problems occurred in the prior art can be effectively solved.

In addition, in practical applications, the oversampling-based adaptive equalizer 20 of the invention can also repeat the above-mentioned steps several times and average the equalizer setup values to obtain the optimized equalizer setup value without any specific limitations.

A second embodiment of the invention is an adaptive equalizer operating method. In this embodiment, the adaptive equalizer operating method is applied in an oversampling-based adaptive equalizer, but not limited to this.

Figure 5:
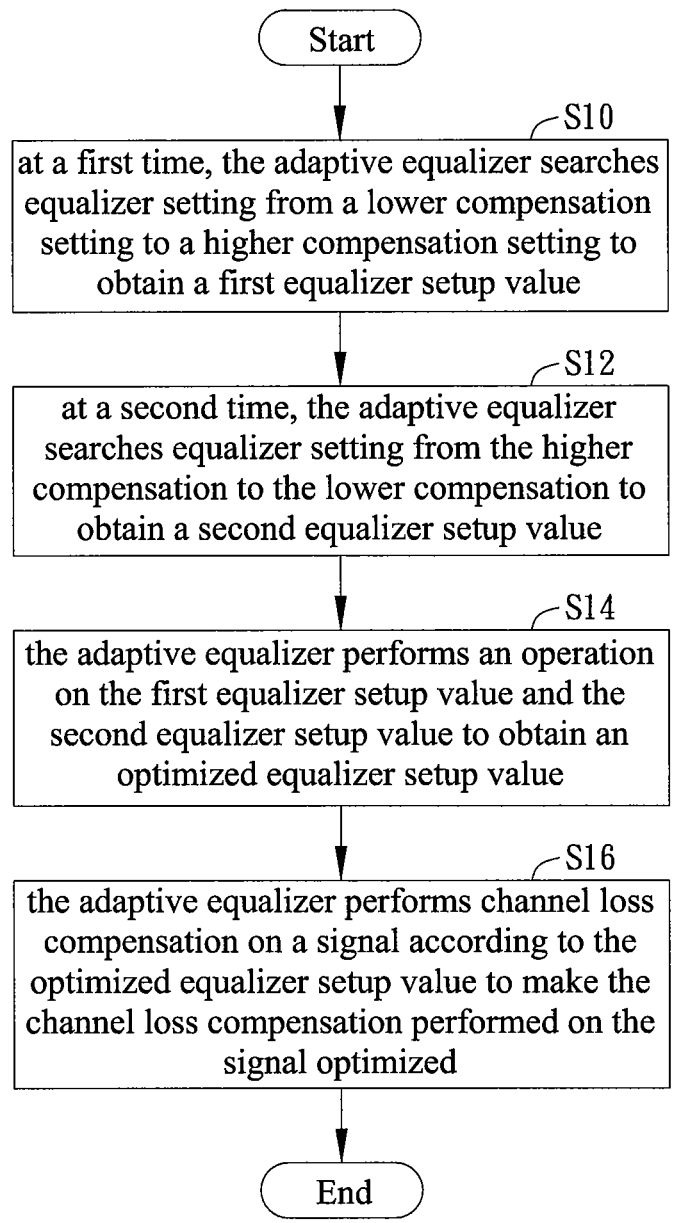
FIG. 5 illustrates the flowchart of the adaptive equalizer operating method disclosed by the invention.

Please refer to FIG. 5. FIG. 5 illustrates the flowchart of the adaptive equalizer operating method disclosed by the invention. As shown in FIG. 5, the adaptive equalizer operating method includes the following steps. At first, in step S10, at a first time, the adaptive equalizer searches equalizer setting from a lower compensation setting to a higher compensation setting to obtain a first equalizer setup value.

Then, in step S12, at a second time, the adaptive equalizer searches equalizer setting from the higher compensation to the lower compensation to obtain a second equalizer setup value. In fact, the first time is earlier or later than the second time; the directions of the first path and the second path are opposite.

Afterward, in step S14, the adaptive equalizer performs an operation on the first equalizer setup value and the second equalizer setup value to obtain an optimized equalizer setup value. In fact, in step S14, the operation performed by the method on the first equalizer setup value and the second equalizer setup value can be an arithmetic mean operation, a geometric mean operation, a quadratic mean operation, or a weighted mean operation.

At last, in step S16, the adaptive equalizer performs channel loss compensation on a signal according to the optimized equalizer setup value to make the channel loss compensation performed on the signal optimized.

It should be noticed that since the first equalizer setup value corresponds to a phenomenon that the channel loss compensation is under compensation and the second equalizer setup value corresponds to a phenomenon that the channel loss compensation is over compensation, the optimized equalizer setup value generated after the adaptive equalizer performs the operation (for example, the arithmetic mean operation) on the first equalizer setup value and the second equalizer setup value can effectively avoid the under compensation phenomenon and the over compensation phenomenon, and the channel loss compensation performed on the signal can be optimized.

Compared to the prior art, the oversampling-based adaptive equalizer and the operating method thereof in this invention perform two data edge searches on signals along the paths in opposite directions respectively, and then operate the equalizer setting results obtained in the two data edge searches to obtain the optimized equalizer setup value. Since the two equalizer setting results respond to a phenomenon that the channel loss compensation is under compensation and a phenomenon that the channel loss compensation is over compensation respectively, the optimized equalizer setup value obtained by operating the two equalizer setting results can effectively avoid the under compensation phenomenon and the over compensation phenomenon, and the effect of the channel loss compensation performed by the oversampling-based adaptive equalizer of the invention on the signal can be optimized.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. An adaptive equalizer, being oversampling-based and coupled to a monitor, the adaptive equalizer comprising:
    a searching module, for searching equalizer setting from a lower compensation setting to a higher compensation setting to obtain a first equalizer setup value and searching equalizer setting from the higher compensation to the lower compensation to obtain a second equalizer setup value;
    an operating module, coupled to the searching module, the operating module using a weight to perform a weighted mean operation on the first equalizer setup value and the second equalizer setup value to obtain an optimized equalizer setup value; and
    a compensation module, coupled to the operating module, for performing an optimized channel loss compensation on a signal according to the optimized equalizer setup value to convert the signal into a compensated signal;
    wherein the monitor monitors the compensated signal outputted by the compensation module to generate a monitored result and outputs a feedback signal to the searching module according to the monitored result, when the searching module searches again, the searching module adjusts itself according to the feedback signal to obtain another first equalizer setup value and another second equalizer setup value.

2. The adaptive equalizer of claim 1, wherein when the operating module receives the another first equalizer setup value and the another second equalizer setup value, the operating module uses another weight to perform the weighted mean operation on the another first equalizer setup value and the another second equalizer setup value to obtain another optimized equalizer setup value.

3. The adaptive equalizer of claim 1, wherein the searching module searches equalizer setting from the lower compensation setting to the higher compensation setting at a first time, and searches equalizer setting from the higher compensation to the lower compensation at a second time, the first time is earlier or later than the second time.

4. The adaptive equalizer of claim 1, wherein the first equalizer setup value corresponds to a phenomenon that the channel loss compensation is under compensation and the second equalizer setup value corresponds to a phenomenon that the channel loss compensation is over compensation.

5. An adaptive equalizer operating method, applied in an oversampling-based adaptive equalizer coupled to a monitor, the method comprising steps of:
    (a) the adaptive equalizer searching equalizer setting from a lower compensation setting to a higher compensation setting to obtain a first equalizer setup value;
    (b) the adaptive equalizer searching equalizer setting from the higher compensation to the lower compensation to obtain a second equalizer setup value;
    (c) the adaptive equalizer using a weight to perform a weighted mean operation on the first equalizer setup value and the second equalizer setup value to obtain an optimized equalizer setup value; and
    (d) the adaptive equalizer performing an optimized channel loss compensation on a signal according to the optimized equalizer setup value to convert the signal into a compensated signal;
    wherein the monitor monitors the compensated signal to generate a monitored result and outputs a feedback signal to the adaptive equalizer according to the monitored result, wherein when the method performs steps (a) and (b) again, the adaptive equalizer adjusts itself according to the feedback signal to obtain another first equalizer setup value and another second equalizer setup value.

6. The adaptive equalizer operating method of claim 5, wherein when the method performs step (c) again, the adaptive equalizer uses another weight to perform the weighted mean operation on the another first equalizer setup value and the another second equalizer setup value to obtain another optimized equalizer setup value.

7. The adaptive equalizer operating method of claim 5, wherein the step (a) and the step (b) are performed at a first time and a second time respectively, the first time is earlier or later than the second time.

8. The adaptive equalizer operating method of claim 5, wherein the first equalizer setup value corresponds to a phenomenon that the channel loss compensation is under compensation and the second equalizer setup value corresponds to a phenomenon that the channel loss compensation is over compensation.

9. An adaptive equalizer operating method, applied in an oversampling-based adaptive equalizer coupled to a monitor, the method comprising steps of:
   searching equalizer setting from a lower compensation setting to a higher compensation setting to obtain a first equalizer setup value;
   searching equalizer setting from the higher compensation to the lower compensation to obtain a second equalizer setup value;
   performing a weighted mean operation on the first equalizer setup value and the second equalizer setup value to obtain an optimized equalizer setup value;
   performing an optimized channel loss compensation on a signal according to the optimized equalizer setup value to convert the signal into a compensated signal;
   monitoring the compensated signal to generate a monitored result;
   outputting a feedback signal to the adaptive equalizer according to the monitored result; and
   adjusting the adaptive equalizer according to the feedback signal to obtain another first equalizer setup value and another second equalizer setup value.

10. The adaptive equalizer operating method of claim 9, wherein both "searching" steps and both "performing" steps are conducted by the adaptive equalizer.

* * * * *